April 11, 1950          B. F. GREGORY          2,503,477
FRONT WHEEL DRIVE FOR MOTOR VEHICLES
Filed Dec. 15, 1945          2 Sheets-Sheet 1

INVENTOR
Benjamin F. Gregory
BY
Fishburn Mullendore
ATTORNEYS

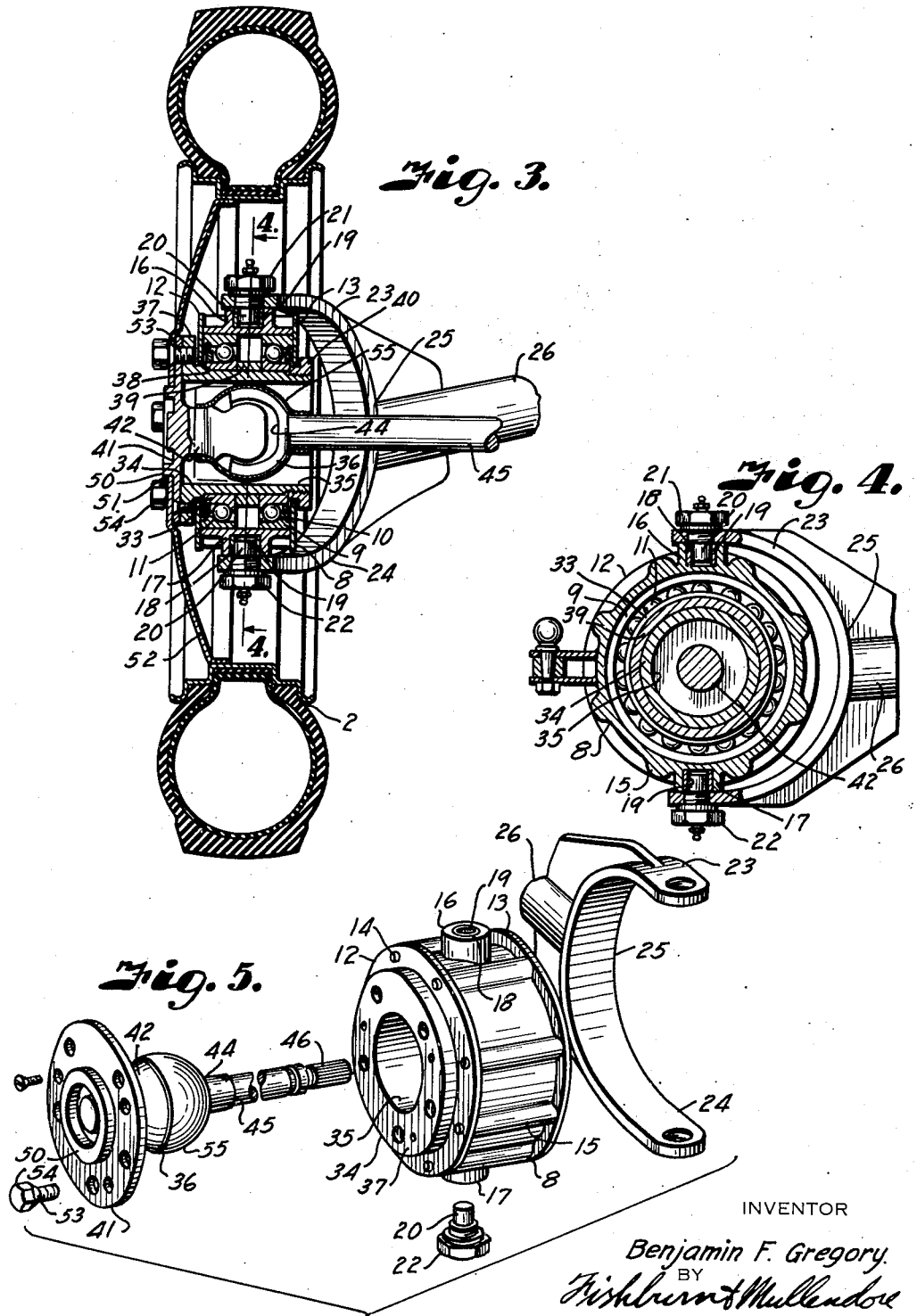

Patented Apr. 11, 1950

2,503,477

UNITED STATES PATENT OFFICE 2,503,477

FRONT-WHEEL DRIVE FOR MOTOR VEHICLES

Benjamin F. Gregory, Kansas City, Mo., assignor, by mesne assignments, of one-half to Martha Realty Company, a corporation of Missouri Application December 15, 1945, Serial No. 635,328

2 Claims. (Cl. 180—48)

This invention relates to motor vehicles and more particularly to a front wheel drive wherein the wheels have individual or knee action, the principal objects being to provide a front drive of this character that is of simple and low cost construction and which has a substantially longer life than front wheel drives heretofore constructed.

Other objects of the invention are to provide a structure which permits location of the wheel turning axes in the center of the wheels and in the central plane of wheel rotation; to provide a structure which permits use of simple and relatively inexpensive universal joints and small diameter wheel bearings; to provide a structure which facilitates assembly and removal of the drive shafts and universal joints; and to provide a front wheel drive that is of light weight construction.

In accomplishing these and other objects of the invention I have provided improved structure, the preferred form of which is illustrated in the accompanying drawings wherein:

Fig. 3 is a vertical section through one of the front wheels particularly illustrating the wheel bearing, king pin mounting and wheel drive.

Fig. 4 is a section on the line 4—4 of Fig. 3.

Fig. 5 is a perspective view of one of the wheel bearing housings and its related mounting yoke, drive shaft, universal joint and drive flange shown in disassembled spaced relation to better illustrate the construction thereof.

Figure 1:
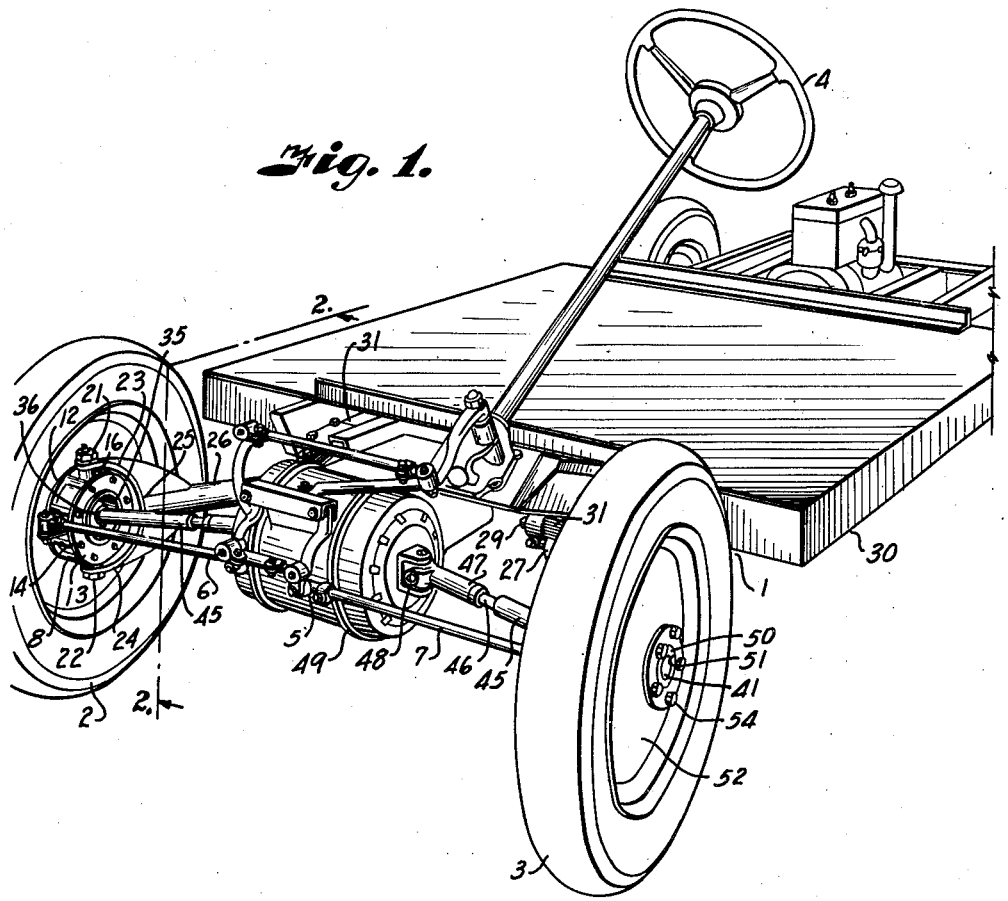
Fig. 1 is a perspective view of a motor vehicle chassis equipped with a front wheel drive embodying the features of the present invention.

Referring more in detail to the drawings:

1 designates a vehicle chassis having front wheels 2 and 3 mounted for individual movement or knee action and adapted to be steered by a wheel 4 connected with a link mechanism 5 and through a system of levers with drag links 6 and 7 that are connected to bearing housings 8 of the respective wheels.

The bearing housings 8 are of substantially cylindrical form to provide support for the outer races 9 of inner and outer anti-friction bearings 10 and 11, the bearings being retained by ring-like plates or washers 12 and 13 secured to the sides of the bearing housing by fastening devices such as cap screws 14 extending through suitable openings in the rim and threaded sockets located in the end of ribs 15 provided on the circumference of the bearing housing. Formed on each bearing housing and extending in opposite radial directions are bosses 16 and 17 having sockets 18 for bushings 19 that are pressed therein to turn upon pintles 20 of king pins 21 and 22 that are threaded in arms 23 and 24 of a yoke 25.

Figure 2:
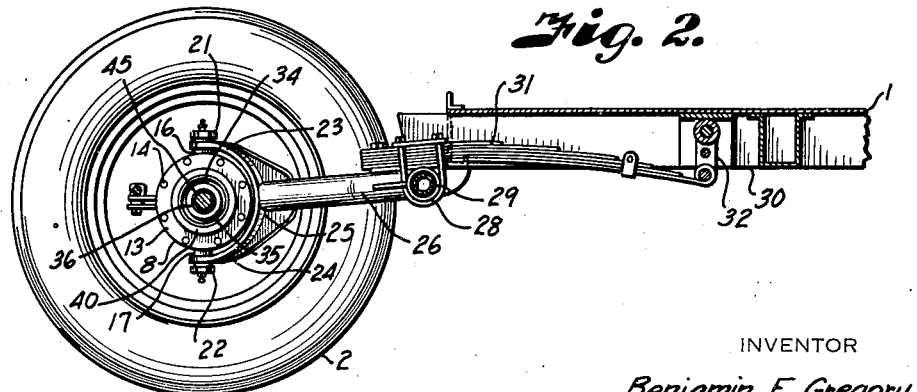
Fig. 2 is a vertical longitudinal section through the forward portion of the chassis taken on the line 2—2 of Fig. 1.

The yokes 25 are carried on wheel mounting arms 26 and 27 extending rearwardly and inwardly toward the center line of the vehicle for pivotal mounting on rock sleeves 28 that are carried on supporting shafts 29 extending transversely of the frame 30 of the chassis as best shown in Fig. 2. Fixed to each arm is one end of a spring leaf assembly 31 having the other end secured to the frame by a shackle 32. The particular spring mounting is disclosed in my co-pending application on "Vehicle chassis" filed December 8, 1945, Serial No. 633,767, now Patent No. 2,499,495, granted March 7, 1950, and specifically forms no part of the present invention.

From the structure thus far described, it is obvious that the bearing housings 8 are free to turn on the pintle ends 20 of the king pins 21 and 22 so that the wheels may be steered to guide the directional movement of the vehicle. It is also obvious that the wheels have individual mounting for individual road action.

Supported within inner races 33 of the anti-friction bearings 10 and 11 of each housing 8 is a wheel hub 34 of sleeve-like formation and having an inner bore 35 of suitable diameter to accommodate a universal joint 36 later described. The hubs have circumferential flanges 37 at the outer end and a threaded periphery at the other as best shown in Fig. 3. Formed on the sleeve-like body of each hub adjacent the flanges 37 is an annular shoulder 38 to seat the inner race of the outer bearing. Sleeved over the hub and engaging the opposite side of the race to space the bearings is a spacing ring 39. The inner race of the bearing 10, spacing ring 39 and inner race of the bearing 11 are retained in fixed assembly by a ring-like nut 40 that is threaded onto the sleeve-like body of each hub to engage the inner race of the bearing 10 as shown in Fig. 3. It is thus obvious that the hubs are rotatably mounted in the bearings and are retained in fixed axial relationship with respect to the bearing housings for the wheels.

Seated upon the outer face of each flange 37 is a drive plate 41 having one member 42 of a universal joint 36 connected to the inner side thereof whereby the universal joint is contained within the bore of the hub. The other member 44 of each universal joint is connected with a drive shaft section 45 having a splined end 46 slidably mounted in the tubular shaft section 47 which in turn is connected through a universal joint 48 with a differential driving mechanism that is contained within a housing 49 illustrated in Fig. 1 and which forms no part of the present invention.

The drive plate 41 has a circular flange 50 projecting from the outer face thereof to pass through axial openings 51 in the disk portions 52 of the wheels 2 and 3. The wheel and drive plates are retained in assembly with the hubs by cap screws 53 that extend through suitable openings in the wheel disks, drive plates and into internally threaded openings in the flanges of the wheel hubs as best illustrated in Figs. 3 and 5. The heads 54 of the cap screws project outwardly from the face of the wheel disks and may be covered if desired by conventional wheel caps (not shown). The universal joints may be provided with covers 55 for retaining grease and excluding dust and dirt.

In assembling the wheel drives, the bearing housings 8 containing the bearings 10 and 11 and the wheel hubs 34 are mounted in the arms 23 and 24 of the yokes 25. The drive shaft sections 45 are then inserted through the bores 35 of the wheel hubs 34 from the outer ends so that the splined ends 46 enter the tubular drive shaft sections 47, the drive plates 41 being moved into position for registry with the threaded openings in the flanges of the wheel hubs. The wheels 2 and 3 are then applied and the part retained in assembly by inserting the cap screws 53. Upon turning of the steering wheel 4, the wheels 2 and 3 turn on the king pins 21 and 22 which are located substantially in the central plane of wheel rotation as clearly shown in Fig. 3. Such mounting facilitates steering and provides a stronger wheel support. The exterior connection of the wheel bearing housing with the yokes of the wheel mounting arms permits the use of relatively small diameter anti-friction bearings and facilitates connection of the wheel mounting arms.

When it is desirable to remove one of the drive shafts, the wheel mounting arm for that wheel is supported by means of a jack. The cap screws 53 which retain the wheel and the drive plate are removed. The wheel and drive plate are then withdrawn to draw the drive shaft section 47 from the tubular section.

From the foregoing it is obvious that I have provided a front drive for independently mounted wheels which is of simple and relatively inexpensive construction and which may comprise relatively light-weight wheel driving units that also facilitates steering of the vehicle on which the wheels are mounted.

What I claim and desire to secure by Letters Patent is:

1. An apparatus of the character described, a wheel bearing housing, bearings supported in said housing, a sleeve-like wheel hub journalled in said bearings, a wheel attaching flange on an outer end of said hub, a drive plate closing the outer end of the hub, a drive shaft extending into substantially axial registry with the other end of the wheel hub, a universal joint in the wheel hub including one joint member connected with the drive plate and a complementary joint member connected with the drive shaft, a wheel connected with the hub, diametrically opposed pivot pin engaging portions projecting from the bearing housing, a yoke having arms cooperating with the pin engaging portions for supporting the bearing housing, pivot pins connecting the arms with said pin engaging portions, and a mounting arm connected with said yoke.

2. An apparatus of the character described, a wheel bearing housing, bearings supported in said housing, a sleeve-like wheel hub journalled in said bearings and having inner and outer ends, a wheel attaching flange on said outer end of the hub, a drive plate closing the outer end of the hub means for removably attaching the drive plate to the flange, a drive shaft extending into substantially axial registry with the inner end of the wheel hub, a universal joint in the wheel hub having one joint member connected with the drive plate and a complementary joint member connected with the drive shaft, a wheel connected with the hub, diametrically opposed pivot pin engaging portions projecting from the bearing housing, a yoke having arms cooperating with the pin engaging portions for supporting the bearing housing, pivot pins connecting the arms with said pin engaging portions, and a mounting arm connected with said yoke.

BENJAMIN F. GREGORY.

REFERENCES CITED

The following references are of record in the file of this patent:

UNITED STATES PATENTS

| Number | Name | Date |
|---|---|---|
| 963,609 | Mascord | July 5, 1910 |
| 1,171,942 | Goodwin | Feb. 15, 1916 |
| 1,676,322 | Chilton | July 10, 1928 |
| 1,695,579 | Dusseau | Dec. 18, 1928 |
| 1,734,709 | Bayley | Nov. 5, 1929 |
| 1,793,091 | Hudson | Feb. 17, 1931 |
| 2,024,099 | Hofweber et al | Dec. 10, 1935 |

FOREIGN PATENTS

| Number | Country | Date |
|---|---|---|
| 147,826 | Germany | Oct. 31, 1902 |